United States Patent [19]
Konishi et al.

[11] Patent Number: 5,753,867
[45] Date of Patent: May 19, 1998

[54] COMBINATIONAL WEIGHING APPARATUS

[75] Inventors: Hiroe Konishi, Shiga; Shuji Murata, Shiga, both of Japan

[73] Assignee: Ishida Co., Ltd., Kyoto, Japan

[21] Appl. No.: 593,840

[22] Filed: Jan. 30, 1996

[30] Foreign Application Priority Data

Feb. 2, 1995 [JP] Japan .................................. 7-039350

[51] Int. Cl.⁶ .................................................. G01G 13/00
[52] U.S. Cl. .................................................... 177/25.18
[58] Field of Search .................................. 177/25.18, 59

[56] References Cited

U.S. PATENT DOCUMENTS

| | | |
|---|---|---|
| 4,398,612 | 8/1983 | Mikami, et al. .............. 177/25.18 |
| 4,627,012 | 12/1986 | Yamada ........................ 177/25.18 |
| 4,645,020 | 2/1987 | Haze ............................ 177/25.18 |
| 4,811,256 | 3/1989 | Yamada et al. ............. 177/25.18 X |
| 4,853,881 | 8/1989 | Yamada ...................... 177/25.18 X |

FOREIGN PATENT DOCUMENTS

| | | |
|---|---|---|
| 267664 | 5/1988 | European Pat. Off. . |
| 298736 | 1/1989 | European Pat. Off. . |
| 2074329 | 10/1981 | United Kingdom . |

Primary Examiner—Vit W. Miska
Assistant Examiner—Randy W. Gibson
Attorney, Agent, or Firm—Loeb & Loeb LLP

[57] ABSTRACT

A combinational weighing or counting apparatus for performing a combinational calculation of measured weights or number of to-be-weighed articles M measured by a plurality of weighing hoppers 10 to determine a combination which gives the weight or number falling within a permissible range. This apparatus includes a mode selector 38 for setting the apparatus to one of weighing and discharge modes, and a mode control 39 for controlling the apparatus on the basis of one of the weighing and discharge modes which has been selected. During the weighing mode having been selected, the mode control 39 activates supply units S in operative association with selective opening and closing of the weighing hoppers 10. On the other hand, during the discharge mode having been selected, the mode control means 39 activates the supply units S while the weighing hoppers 10 are kept in fully opened position, to thereby allow the articles M remaining in the supply units S to be continuously discharged to the outside of the apparatus.

7 Claims, 5 Drawing Sheets

COMBINATIONAL WEIGHING APPARATUS

BACKGROUND OF THE INVENTION

1. Field of the Invention

The present invention relates to a combinational weighing or counting apparatus of a type wherein articles to be weighed such as, for example, snacks and/or candies are dispersed into a plurality of weighing devices so that a combination of the weighing devices giving respective results of measurement which approximate to a target supply value is selected and the articles are then discharged. More specifically, the present invention relates to the combinational weighing or counting apparatus of the type referred to above, wherein change of one kind of the articles to be weighed over to another kind of the articles to be weighed can be accomplished quickly.

2. Description of the Prior Art

A combinational weighing or counting apparatus is known as an apparatus for weighing to-be-weighed articles such as snacks and/or candies of a varying size and/or shape, of which weight is not fixed and varies from one article to another, so as to fall within a target range of weight. (U.S. Pat. No. 4,398,612, issued Aug. 16, 1993.)

This type of prior art combinational weighing or counting apparatus comprises a plurality of weighing heads each including a driving feeder for supplying the articles to be weighed, a pool hopper, and a weighing device having a weighing hopper coupled with a weighing means. This prior art combinational weighing or counting apparatus is so designed as to perform a combinational calculation of weights measured by the respective weighing devices, then to select a combination of the weighing hoppers which eventually give the weight or number falling within a permissible range and finally to discharge the articles, for obtaining the articles falling within the target weight or number range.

In this prior art combinational weighing or counting apparatus, where the kinds of the articles to be weighed are desired to be changed, an attendant worker has to manually change an operating mode to assume a discharge mode so that by selectively opening and closing the pool and weighing hoppers of each weighing heads in a predetermined pattern, for example, by dividing the entire weighing heads into three groups and selectively opening and closing the weighing and pool hoppers of each group, the remaining articles can be discharged to the outside of the apparatus.

After the all remaining articles have been recovered in the manner described above, the discharge mode is brought to a halt, and the subsequent cycle of operation of the apparatus under the weighing mode with succeeding articles supplied into the apparatus is initiated after the supply passages for the supply of the articles therethrough in the apparatus have been rinsed and/or cleaned.

The prior art combinational weighing or counting apparatus has, however, the following problems. Specifically, when the articles remaining in the apparatus are to be discharged in anticipation of change of the articles to be weighed, a relatively long period of time is required before complete discharge of the remaining articles by opening and closing the pool and weighing hoppers in a predetermined pattern, accompanied by reduction in net operating rate of the apparatus as a whole.

In addition, since the selective opening and closing of the pool and weighing hoppers are repeated for each group, obnoxious slamming sounds tend to be generated.

SUMMARY OF THE INVENTION

The present invention has been devised to substantially eliminate the above discussed problems and is intended to provide an improved combinational calculating or counting apparatus wherein the tact time of the apparatus is increased by reducing the time required to change the articles to be weighed and which would not generate slamming sounds when hoppers are selectively opened and closed.

To this end, a combinational weighing or counting apparatus according to one aspect of the present invention comprises a plurality of weighing devices each having a weighing hopper for weighing articles to be weighed while the articles are accommodated within the weighing hopper; a plurality of supply means for supplying the articles to the weighing hoppers, respectively; a combinational calculating means for performing a combinational calculation of a measured value of the articles measured by each of the weighing devices or a number obtained from the measured value to give a weight or a number falling within a permissible range; a mode selecting means for selecting one of weighing and discharge modes; and a mode control means. The mode control means is operable, when the weighing mode is selected by the mode selecting means, to activate the combination calculating means and also to activate the supply means in association with selective opening and closing of the weighing hoppers, but is operable, when the discharge mode is selected by said mode selecting means, to activate the supply means while the weighing hoppers are kept opened fully to thereby continuously discharge the articles remaining within the supply means to an outside of the apparatus.

According to the above described construction, when the mode selecting means is set to the discharge mode at the time the kind of the articles to be weighed is desired to be changed, the weighing hoppers are retained fully opened and the supply means are successively driven to allow the remaining to-be-weighed articles to be discharged continuously to the outside of the apparatus through the weighing hoppers then held in a fully opened position. Moreover, since the weighing hoppers are held in the fully opened position, even though the feed capability of the supply means to supply the articles to be weighed is increased, a smooth flow of the articles can be created. For these reasons, the articles remaining in the apparatus can quickly be discharged in readiness for the subsequent cycle of weighing of the articles to be weighed and accordingly, the net operating rate of the apparatus can be increased. Also, since the weighing hoppers are retained in the fully opened position, the hoppers will not generate any obnoxious slamming sound, making it possible to create a quiet working environment with noise level reduced.

According to another aspect of the present invention, there is provided a combinational weighing or counting apparatus which comprises a plurality of weighing devices including a corresponding number of weighing hoppers for weighing articles to be weighed while the articles are accommodated within the weighing hoppers; a plurality of supply means for supplying the articles to the weighing hoppers, respectively; a group dividing means for dividing into a plurality of groups supply passages each leading from each of the supply means to the associated weighing hopper; an article delivery means employed for each of the groups for delivering the articles; a combination calculating means for performing a combinational calculation of a measured value of the articles measured by each of the weighing devices of each group or a number obtained from the measured value to give a weight or a number falling within a permissible range for each group; a mode selecting means for selecting one of weighing and discharge modes; a group specifying means for specifying one of the groups to be set in the discharge mode by the mode selecting means; and a mode control means. The mode control means is operable, when the weighing mode is selected by the mode selecting means, to activate the combination calculating means and also to activate the supply means in association with selective opening and closing of the weighing hoppers. However, when the discharge mode is selected by the mode selecting means, the mode control means operates to activate the supply means while the weighing hoppers of one of the groups specified by the group specifying means are kept opened fully to thereby continuously discharge the articles remaining within the supply means to an outside of the apparatus.

With the construction according such another aspect of the present invention, in the combinational calculating apparatus of a type wherein a plurality of different kinds of articles are supplied for respective groups so that the articles can be weighed and discharged for each group or can be mixed together and discharged after the articles for each group have been weighed, when the mode selecting means is set to the discharge mode and one of the groups to be set under the discharge mode is specified by the group specifying means, the weighing hoppers of the group so specified can be retained in the fully opened position and only the supply means belonging to the specified group can be driven. Accordingly, where of the plural kinds only one or some of the kinds of the articles are to be changed, only the articles remaining in the supply means of the group of the kind or kinds of the articles to be changed can be discharged and, on the other hand, the kind or kinds of the articles of the group which need not be changed can be retained as remaining in the supply means, thereby eliminating the necessity of the to-be-subsequently-weighed articles to be prepared in readiness for supply. The discharge of the remaining articles can quickly be accomplished by allowing the remaining articles to continuously flow through the weighing hoppers then retained in the fully opened position. For this reason, the net operating rate of the apparatus can further be increased.

The combinational weighing or counting apparatus according to one preferred embodiment of the present invention further comprises a supply control means which, when the weighing mode is selected, controls a feed capability of each of the supply means on the basis of a weighed value, but which, when the discharge mode is selected, controls the feed capability to a predetermined level.

The use of the supply control means is effective in that since during the weighing mode having been selected the feed capability of the supply means is controlled on the basis of the weighed value, the accuracy of combination can advantageously be increased and also in that during the discharge mode having been selected the feed capability of the supply means can be controlled to a predetermined value. At this time, since the weighing hoppers are held in the fully opened position, even though the feed capability is set to a maximum value, a smooth flow of the articles through the weighing hoppers can be created and, for this reason, the articles remaining in the apparatus can quickly be discharged. On the other hand, where the articles to be weighed are of a type large in size and tending to form bridges at discharge ports, the remaining articles can be smoothly discharged by suitably adjusting the feed capability to a value required to avoid any possible occurrence of clogging.

According to another preferred embodiment of the present invention, each of said supply means may preferably include a driving feeder for supplying the articles, and a pool hopper for storing the articles supplied from the driving feeder. In such case, the combinational weighing or counting apparatus may further comprises a feed parameter setting means for regulating a feed capability of each of the driving feeders and may be so designed that when the weighing mode is selected, the mode control means can cause the feed parameter setting means to set the feed capability of each of the driving feeders to a value required for the weight or number of the articles, stored in the respective pool hopper, to attain a predetermined target supply value, and that when the discharge mode is selected, the mode control means can cause all of the pool hoppers and, also, all of the weighing hoppers to be fully opened and also cause the feed parameter setting means to set the feed capability of all of the driving feeders to a value greater than that sustained during the weighing mode.

According to this another preferred embodiment of the present invention, when the discharge mode is selected, not only can the pool hoppers and the weighing hoppers of all of the weighing heads be controlled to assume the fully opened position, but also the feed capability of the driving feeders of all of the weighing heads can be set to a value greater than the feed capability assumed during the weighing mode. Accordingly, the articles remaining in the apparatus can be quickly discharged through the pool hoppers and the weighing hoppers both then fully opened.

The present invention also pertains to a combinational weighing or counting method in which articles to be weighed are supplied from a plurality of supply means to a plurality of weighing devices each having a weighing hopper and a combinational calculation of a measured weight or number of the articles measured by each of the weighing devices is then performed to determine a combination in which the weight or number of the articles may fall within a permissible range. This combinational weighing or counting method includes a step of selecting one of weighing and discharge modes such that when the weighing mode is selected, the combinational calculation is performed and, also, the supply means are activated in association with selective opening and closing of the weighing hoppers, and that when the discharge mode is selected, the supply means are activated while the weighing hoppers are kept fully opened to thereby continuously discharge the articles remaining within the supply means to the outside of the apparatus.

According to this combinational weighing or counting method, effects similar to those brought about by the combinational weighing or counting apparatus according to the first mentioned aspect of the present invention can be obtained.

Another aspect of the combinational weighing or counting method according to the present invention is such that supply passages through which articles to be weighed are supplied from a plurality of supply means towards a corresponding number of weighing devices each having a weighing hopper are divided into a plurality of groups so that the articles can be supplied for each group and a combinational calculation of a measured weight or number of the articles measured by the weighing devices of each of the groups is then performed to determine a combination in which the weight or number of the articles may fall within a permissible range for each group. This alternative combinational weighing or counting method includes the steps of selecting one of weighing and discharge modes, specifying one of the groups which is to be set under the discharge mode, performing the combinational calculation and activating the supply means in association with selective opening and closing of the weighing hoppers, when the weighing mode is selected, and activating the supply means while the weighing hoppers of the specified group are kept fully opened to thereby continuously discharge the articles belonging to the group to an outside, when the discharge mode is selected.

Even this alternative combinational weighing or counting method can bring about effects similar to those brought about by the combinational weighing or counting apparatus according to the second mentioned aspect of the present invention can be obtained.

BRIEF DESCRIPTION OF THE DRAWINGS

In any event, the present invention will become more clearly understood from the following description of preferred embodiments thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
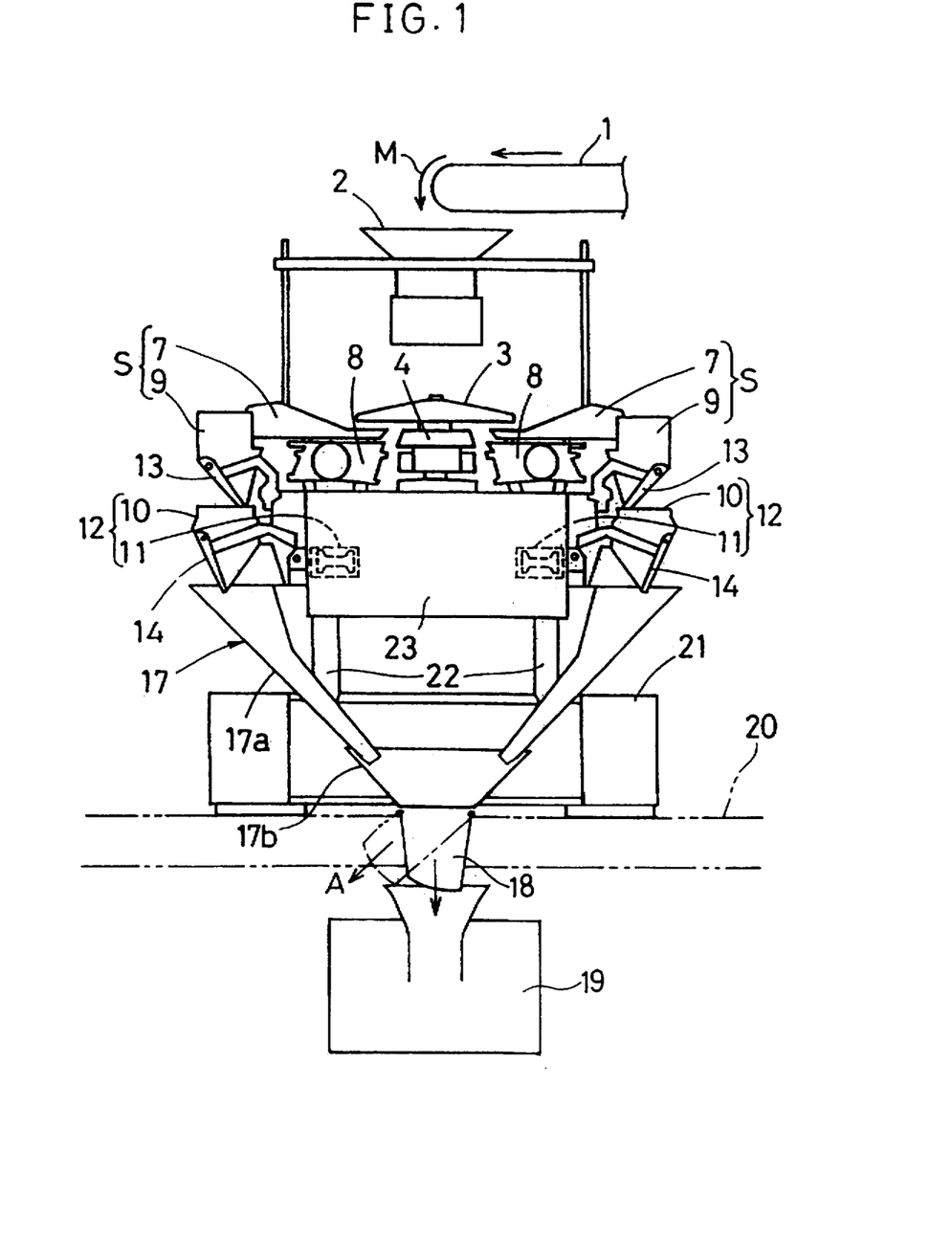
FIG. 1 is a schematic front elevational view, with portions cut away, of a combinational weighing apparatus according to a first preferred embodiment of the present invention.

Referring first to FIG. 1 showing a combinational weighing apparatus according to a first preferred embodiment of the present invention, articles M to be weighed supplied by means of a transport conveyor 1 are supplied onto a dispensing feeder 3 of a generally flattened conical configuration through a guide chute 2. The dispensing feeder 3 is drivingly coupled with an oscillator 4 so that the dispensing feeder 3 can be vibrated to facilitate dispersion of the articles M so supplied onto the dispensing feeder 3. A plurality of driving feeders 7 each drivingly coupled with a respective oscillator 8 are positioned in a circular row below an outer periphery of the dispensing feeder 3 and spaced a distance from each other in a direction circumferentially of the dispensing feeder 3. A pool hopper 9 having a bottom opening adapted to be selectively opened and closed by a respective gate 13 is disposed beneath an outer portion of each of the driving feeder 7 remote from the dispensing feeder 3. A plurality of weighing hoppers 10 equal in number to that of the pool hoppers 9 and each having a bottom opening adapted to be selectively opened and closed by a respective gate 14 are disposed beneath the respective pool hoppers 9.

It is to be noted that a combination of each driving feeder 7 and the associated pool hopper 9 forms a supply means S for supplying the articles M to be weighed onto the respective weighing hopper 10. Thus, it will readily be understood that each driving feeder 7 is, when vibrated by the associated oscillator 8, operable to supply the articles M to be weighed, supplied from the dispensing feeder 3, onto the respective pool hopper 9 and that the respective pool hopper 9 after having temporarily pooled the articles M discharges the articles M onto the corresponding weighing hopper 10 when the gate 13 is opened.

Each of the weighing hoppers 10 is supported by a weighing means 11 such as, for example, a load cell, for measuring the weight of the articles M supplied into such weighing hopper 10. Each weighing hopper 10 and the associated weighing means 11 supporting such weighing hopper 10 form a respective weighing device 12. A downwardly oriented collecting chute unit 17 is disposed below the weighing hoppers 10 for collecting the articles M discharged from the weighing hoppers 10 at a lower center location. This downwardly oriented collecting chute unit 17 comprises a fixedly supported common lower chute 17b and a plurality of removably supported upper chutes 17a disposed circumferentially of the lower chute 17b each associated with the respective weighing device 12 and having a lower end communicated with the common lower chute 17b. The common lower chute 17b has a discharge opening defined at the bottom thereof, which discharge opening is communicated with a pivotally supported chute 18. As will become clear from the subsequent description, the articles M discharged from one or more of the weighing hoppers 10 which have been selected are collected by the collecting chute unit 17 and are then supplied to a packaging machine 19 through the pivotally supported chute 18.

Each of the component parts of the combinational weighing apparatus discussed above is supported in a manner which will now be described. A casing 23 is supported through a plurality of support legs 22 by a machine framework 21 fixedly mounted on a machine bench 20. The guide chute 2, the dispensing feeders 3 and the supply means S are arranged above the casing 23 with the weighing devices 12 disposed adjacent to and around an outer periphery of the casing 23. The casing 23 has a hollow chamber defined therein, and close/open controls and drive motors for the pool hoppers 9 and the weighing hoppers 10 are accommodated within the hollow chamber of the casing 23.

A control system for controlling the sequence of operation of the combinational weighing apparatus of the structure described above is shown in a block representation in FIG. 2.

Figure 2:
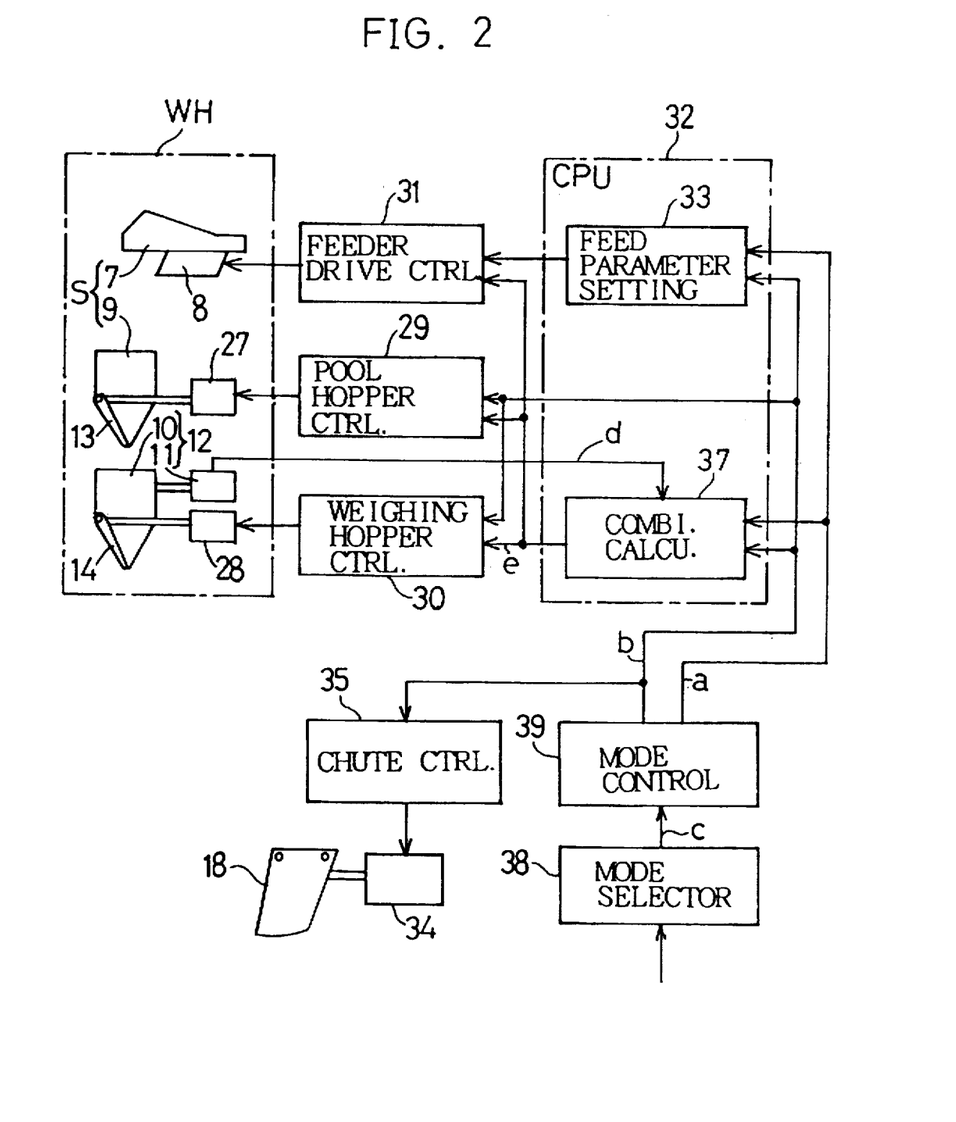
FIG. 2 is a circuit block diagram showing a control system employed in the combinational weighing apparatus according to the embodiment shown in FIG. 1.

Referring now to FIG. 2, a gate drive unit 27 for selectively opening and closing the gate 13 for each pool hopper 9 is controlled by a pool hopper control 29 and a gate drive unit 28 for selectively opening and closing the gate 14 for each weighing hopper 10 is controlled by a weighing hopper control 30. Each of the supply means S for supplying the articles M to be weighed, the weighing device 12 associated with such each supply means S and the associated gate drive units 27 and 28 constitute a weighing head WH. The plural weighing heads WH equal in number to the number of the supply means S are arranged around the dispensing feeder 3 and spaced a distance circumferentially of the dispensing feeder 3. A chute drive unit 34 for rocking the pivotally supported chute 18 is controlled by a chute control 35.

A control device 32 comprising, for example, a central processing unit (CPU) has a feed parameter setting means 33, which is a kind of a supply control means, and a combination calculating means 37 both built therein. Values of feed parameters (such as, for example, the amplitude of and the duration of vibration of the driving feeders), that is, preset value for supply capabilities of the articles M to be weighed, are outputted from the feed parameter setting means 33 to a feeder control 31 to control the operation of each of the driving feeder 7 to thereby adjust the supply capability thereof.

The control device 32 is controlled by a mode control means 39. The mode control means 39 controls the control means 32 according to a mode of operation selected by a manual mode selector means 38. This manual mode selector means 38 is capable of manually selecting one of a weighing mode, in which an ordinary weighing operation is carried out, and a discharge mode in which the articles M to be weighed remaining in the apparatus are discharged outside the apparatus to make it possible to change the articles M.

Figure 5:
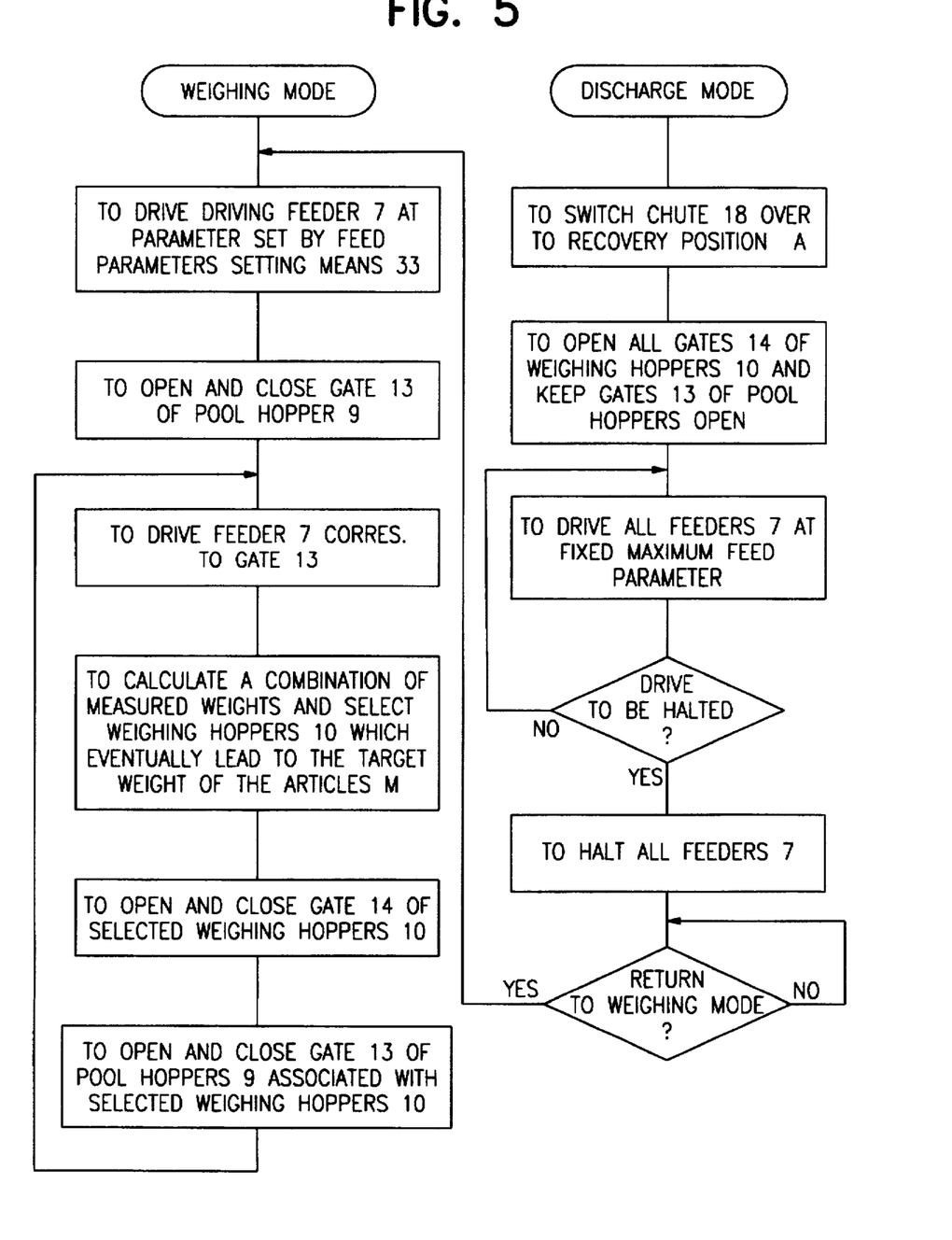
FIG. 5 is a flowchart showing an example of the operation of various modes, and in particular showing an example of the operation of a weighing mode and a discharge mode.

The operation of the combinational weighing apparatus according to the foregoing embodiment will now be described with reference to FIG. 5.

Assuming that the combinational weighing apparatus is powered on and an attendant worker manipulates the mode selector means 38 to select the weighing mode, the manual mode selector means 38 outputs a change-over signal c indicative of selection of the weighing mode to the mode control means 39. In response to receipt of this change-over signal c indicative of the selection of the weighing mode, the mode control means 39 outputs a weighing mode signal a to both of the feed parameter setting means 33 and the combination calculating means 37 within the control device 32. In response to receipt of the weighing mode signal a, the feed parameter setting means 33 feeds a predetermined parameter for each driving feeder 7 to the feeder drive control 31 which in turn controls the driving feeder 7 of each of the weighing heads WH so that the amplitude of and the duration of vibration of the respective driving feeder 7 can be varied to attain the predetermined feed capability necessary to permit the to-be-weighed articles M, then supplied from the transport conveyor 1 through the dispensing feeder 3 each being controlled by the control device 32, to be supplied onto the pool hoppers 9 (Step S1). Subsequently the gate 13 of the pool hopper 9 is opened and then closed to supply the to-be-weighed articles M to the weighing hopper 10 (step S2). The feeder drive control 31 of each of the driving feeders 7 associated with the opened pool hoppers 9 is activated so that the driving feeders 7 of such weighing heads WH are driven to allow the articles M to be supplied into the empty pool hoppers 9 according to the feed parameter set by the feed parameter setting means 33 (Step S3).

During the weighing mode so selected, the feed capability of each driving feeder 7 is so chosen that the total weight of the to-be-weighed articles M within the associated pool hopper 9 can attain a target supply value which varies from one weighing head WH to another weighing head WH with reference to the quotient of a target weight divided by the number of combinations that can be selected. This can be achieved through a feedback of the weight (the measured weight) of the articles M with the associated weighing hopper 10 to adjust the feed capability required for the weight to attain the target supply value. In other words, the feed capability is automatically controlled according to the measured weight of the associated weighing hopper 10 so that the weight of the articles M supplied into such associated weighing hopper 10 can match with the target supply value.

On the other hand, the combination calculating means 37 is operable in response to a weight signal d fed from the weighing means 11 of each of the weighing devices 12 to perform calculation of a combination of measured weights thereof so as to select a combination of the weighing hoppers 10 which may eventually give the total of the weights of the articles M in the respective weighing hoppers 10 that falls within a permissible range determined according to the target value (Step S4). After the calculation, the combination calculating means 37 outputs a select signal e to the weighing hopper controls 30 associated with some of the weighing hoppers 10 so selected to open the corresponding gates 14 to allow the articles M to be discharged from the selected weighing hoppers 10 (Step S5). Then, based on the select signal e and delayed a predetermined timing, the pool hopper control 29 of each of the pool hoppers 9 associated with some of the weighing hoppers 10 selected is activated to open the gates 13 of the pool hoppers 9 of the weighing heads WH which have discharged the articles M to allow the subsequent articles M within the pool hoppers 9 to be supplied into the empty weighing hoppers 10 (Step S6).

Also, based on the select signal e, the feeder drive control 31 of each of the driving feeders 7 associated with the opened pool hoppers 9 is activated so that the driving feeders 7 of such weighing heads WH are driven to allow the articles M to be supplied into the empty pool hoppers 9 according to the feed parameter set by the feed parameter setting means 33.

The operation of the weighing apparatus which takes place during the discharge mode will now be described.

When the attendant worker manipulates the mode selector means 38 to select the discharge mode at the time of change of the articles M to be weighed, the mode control means 39 which has received the change-over signal c indicative of selection of the discharge mode from the mode selector means 38 outputs a discharge mode signal b to the feed parameter setting means 33, the combination calculating means 37, the pool hopper control 29, the weighing hopper control 30 and the chute control 35 (Steps S11 and S12). Accordingly, the combination calculating means 37 is brought in an inactive state, and the pool hopper control 29 and the weighing hopper control 30 are held in position to keep the gates 13 and 14 of all of the weighing heads WH in a full open condition.

At the same time, the feed parameter setting means 33 having received the discharge mode signal b operates, while the gates 13 and 14 are fully opened, to fix a predetermined feed value at which a maximum feed capability can be attained without being accompanied by clogging and to control all of the driving feeders 7 through the respective feeder drive controls 31 (Step S13). In this way, the articles M remaining in the transport conveyor 1 and the dispensing feeder 3, both shown in FIG. 1, successively flow through the opened pool hoppers 9 and then through the opened weighing hoppers 10 finally quickly into the collecting chute unit 17. At this time, the chute control 35 which also has received the discharge mode signal b controls the chute drive unit 34 to cause the pivotally supported chute 18 to pivot from a position, in which the pivotally supported chute 18 are oriented towards the packaging machine 19, to a recovery position A shown by the phantom line in FIG. 1, and accordingly the articles M discharged through the pivotally supported chute 18 then in the recovery position A are recovered for reuse. At this time, the gates 13 and 14 are held in the full open position and, therefore, no sound of the gates being slammed occur, resulting in considerable reduction in noise level. Also, during this discharge mode, the feed capability of the dispensing feeder 3 is increased by causing the control device 32 to increase the amplitude or the duration of vibration of the oscillator 4 for the dispensing feeder 3 to a value higher than that during the weighing mode.

After the articles M remaining in the system have been completely discharged. (Step S14), all the feeders 7 are halted (Step S15). After sweeping and/or rinsing of components required to do so have been done, the mode selector 38 has to be returned to the weighing mode to initiate the next cycle of combination weighing (Step S16) of the articles M to be weighed. As hereinabove discussed, since the remaining articles M can be quickly discharged, the length of time required to initiate the subsequent cycle of combination weighing of the articles M can be advantageously reduced considerably as compared with that exhibited by the prior art combinational weighing apparatus, resulting in increase in efficiency. It is to be noted that, where the packaging machine 19 is of a vertical pillow-type, it may occur that without the pivotally supported chute 18 being employed, the remaining articles M may be directly discharged to the packaging machine 19 during the discharge mode. In such case, the bottom of a bag being manufactured may be broken to allow a tubular film being manufactured to serve as a chute through which the remaining articles M can be recovered.

Figure 3:
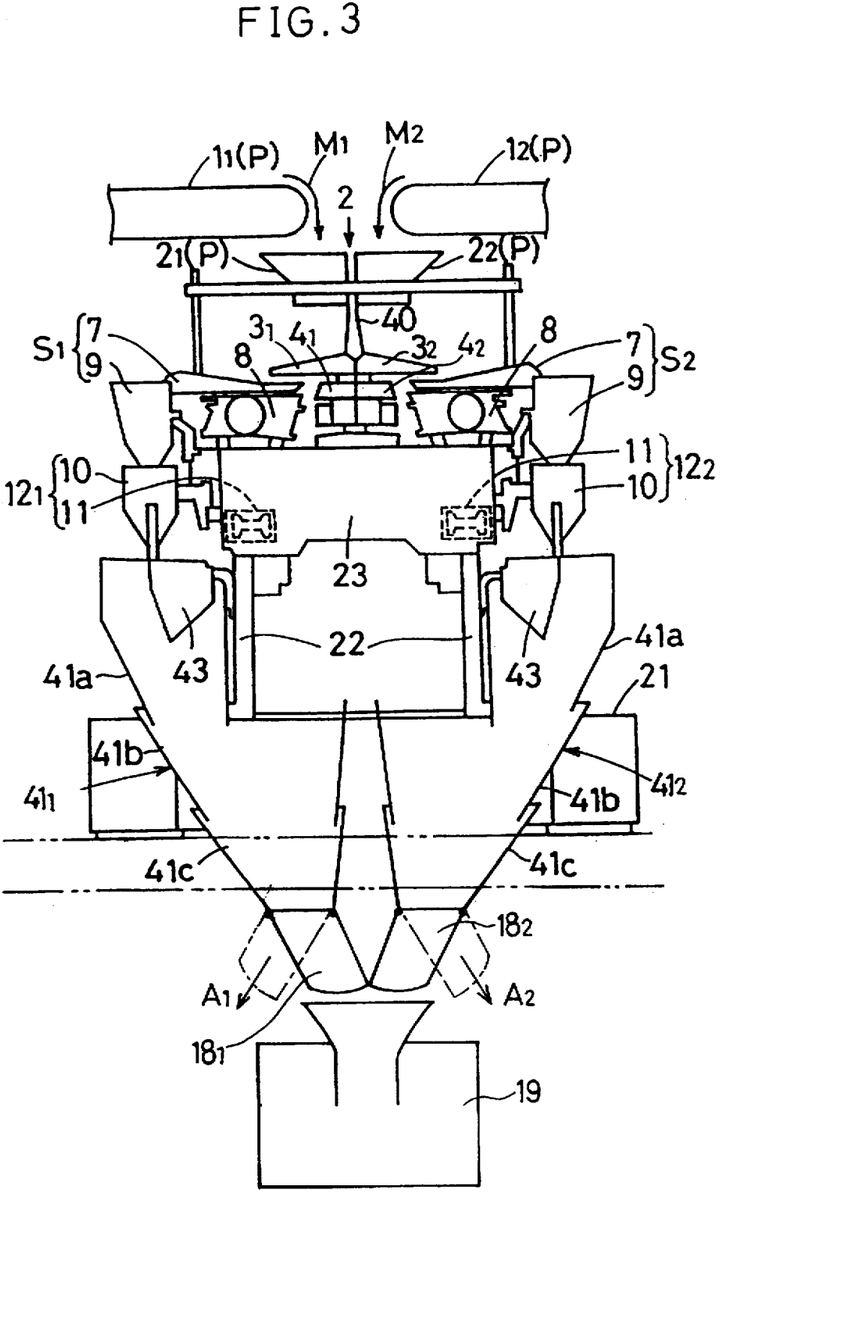
FIG. 3 is a schematic front elevational view, with portions cut away, of a combinational weighing apparatus according to a second preferred embodiment of the present invention.

FIG. 3 illustrates in a schematic front elevational representation the combinational weighing apparatus according to a second preferred embodiment of the present invention. This combinational weighing apparatus shown therein is so designed that all of the weighing heads are divided into a plurality of groups so that in each of the groups calculation is carried out to determine a respective combinations within the permissible range to allow the articles to be weighed, which have been determined, to be discharged independently for each group or to be discharged after having been mixed together. For the purpose of description of the second preferred embodiment of the present invention, reference is made to mixing of two types of articles $M_1$ and $M_2$ to be weighed.

Referring particularly to FIG. 3, a vertical partition plate 40 is disposed above the dispensing feeders $3_1$ and $3_2$ each forming a half of generally flattened conical plate so that two groups of articles $M_1$ and $M_2$ can be supplied onto the associated dispensing feeder $3_1$ or $3_2$. The respective groups of the articles $M_1$ and $M_2$ are transported by separate transport conveyors $1_1$ and $1_2$ and are supplied onto the associated feeder $3_1$ or $3_2$, delimited by the partition plate 40, through dividing chutes $2_1$ and $2_2$ which form respective parts of the guide chute 2. Each of the dispensing feeders $3_1$ and $3_2$ is adapted to be oscillated by a respective oscillator $4_1$ or $4_2$ drivingly coupled therewith. Fourteen driving feeders 7 and an equal number of the pool hoppers 9 are employed for each group, and these fourteen supply means 7 and 9 form 14 supply passages through which the associated group of articles $M_1$ and $M_2$ can be supplied. For each group of the articles $M_1$ and $M_2$, 7 supply passages are allocated. The partition wall 40 referred to above forms a group dividing means for dividing the fourteen supply passages into two groups having respective supply means $S_1$ and $S_2$, and by this partition plate 40, the articles $M_1$ and $M_2$ of different kinds can be supplied from the associated groups of the supply means $S_1$ and $S_2$ to the associated groups of the weighing devices $12_1$ and $12_2$. Each transport conveyor $1_1$ or $1_2$ and the associated dividing chute $2_1$ or $2_2$ form respective parts of an article delivery means P for delivering the corresponding kinds of the articles $M_1$ or $M_2$.

The to-be-weighed articles $M_1$ and $M_2$ weighed by the respective groups of the weighing hoppers 10 are delivered into associated booster hoppers 43 with the weighing hoppers 10 consequently emptied subsequently loaded again with the to-be-weighed articles $M_1$ and $M_2$. The to-be-weighed articles $M_1$ and $M_2$ discharged respectively from the hoppers which have been selected by calculation of a combination of the hoppers 10 and the booster hoppers 43 are, after having been collected by collecting chutes $41_1$ and $41_2$, respectively, supplied to the packaging machine 19 through the associated pivotally supported chutes $18_1$ and $18_2$. Each of the collecting chutes $41_1$ and $41_2$ is of a structure including an upper chute portion 41a, intermediate chute portion 41b positioned below the upper chute portion 41a in communication therewith and a lower chute portion 41c positioned below the intermediate chute portion 41b in communication therewith, all of which are assembled so as to represent the inverted shape of a generally frusto-conical shape. Each upper chute portion 41a accommodates therein a respective booster chute 43 for temporarily storing the to-be-weighed articles $M_1$ or $M_2$ which have been discharged from the associated weighing hopper 10. Each of the pivotally supported chute $18_1$ or $18_2$ is pivotable between the position, in which the pivotally supported chute $18_1$ or $18_2$ is oriented towards the packaging machine 19 and the recovery position in which the pivotally supported chute $18_1$ or $18_2$ is oriented towards a recovery site $A_1$ and $A_2$ as shown by the phantom line in FIG. 3. As will be described later, each pivotally supported chute $18_1$ or $18_2$ assumes, independently to the other one, the position facing the packaging machine 19 during the weighing mode, but the recovery position $A_1$ and $A_2$ during the discharge mode.

A control system for controlling the sequence of operation of the combinational weighing apparatus according to the second preferred embodiment described above is shown in a block representation in FIG. 4.

Figure 4:
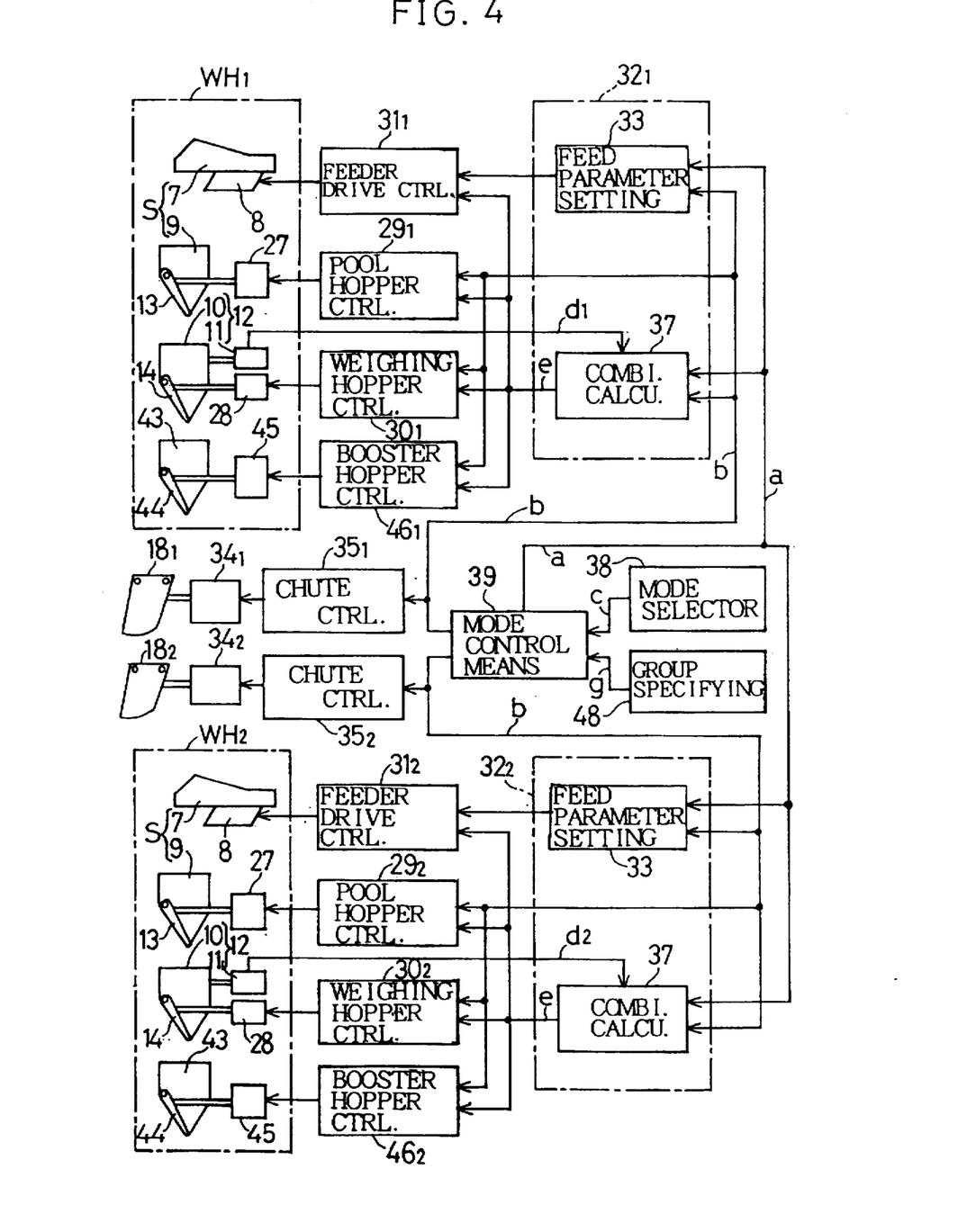
FIG. 4 is a circuit block diagram showing a control system employed in the combinational weighing apparatus according to the embodiment shown in FIG. 3.

Referring now to FIG. 4, the plural weighing heads WH are divided by the group dividing means (the partition plate) 40 into two groups each including the driving feeders 7, the pool hoppers 9, the weighing hoppers 10 and the booster hoppers 43. For each of the groups of the weighing heads $WH_1$ and $WH_2$, the pool hopper controls $29_1$ or $29_2$, the weighing hopper controls $30_1$ or $30_2$, booster hopper controls $46_1$ or $46_2$, and the feeder drive controls $31_1$ or $31_2$ are employed. In addition, for each group of the weighing heads $WH_1$ or $WH_2$, the control device $32_1$ or $32_2$, the chute drive unit $34_1$ or $34_2$, and the chute control $35_1$ or $35_2$ are employed. Also, the mode control means 39 is connected not only with the mode selector means 38, but also with a group specifying means 48. The group specifying means 48 is operable to output a group specifying signal g when one of the groups to be set under the discharge mode is selected by an external manipulation so that the discharge mode signal b from the mode control means 39 can be directed to one of the control devices $32_1$ and $32_2$ which is associated with the specified group.

The combinational weighing apparatus shown in and described with reference to FIG. 4 operates in the following manner.

Assuming that the combinational weighing apparatus is powered on and an attendant worker manipulates the mode selector means 38 to select, for example, the weighing mode, the weighing mode signal a is outputted from the mode control means 39 to each of the control devices $32_1$ and $32_2$ to allow each of the control devices $32_1$ and $32_2$ to control the associated weighing heads $WH_1$ or $WH_2$ in a manner similar to that described with reference to FIG. 2. In other words, the feed parameter setting means 33 and 33 of the respective control devices $32_1$ and $32_2$ apply individually predetermined feed parameters to the associated feeder driving means $31_1$ and $31_2$ to thereby control the driving feeders 7 and 7. On the other hand, each of the combination calculating means 37 and 37 operate in response to receipt of a corresponding weighing signal d1 or d2 fed from one of the weighing devices 12 and 12, which belongs to the associated group, to perform a combinational calculation with respect to the weight of the to-be-weighed articles and the weight (represented by the weight signal generated from the weighing devices $12_1$ or $12_2$ during the previous cycle of weighing) of the to-be-weighed articles transferred onto the booster hoppers 43 to thereby select a combination of the weighing hoppers 10 and the booster hoppers 43 falling within a permissible range for each group so that the gates 14 of the selected weighing hoppers 10 can be opened by the gate drive units $28_1$ or $28_2$ through the weighing hopper control $30_1$ or $30_2$ and, at the same time, gates 44 of the selected booster hoppers 43 can be opened by gate drive units 45 through the booster hopper control $46_1$ or $46_2$. The articles $M_1$ and $M_2$ discharged from the weighing hoppers 10 of the respective groups and the associated booster hoppers 43 are, after having been mixed together through the collecting chutes $41_1$ and $41_2$ and then through the pivotally supported chutes $18_1$ and $18_2$, supplied to the packaging machine 19. It is to be noted that the pivotally supported chutes $18_1$ and $18_2$ may be operatively coupled with separate packaging machines so that the articles $M_1$ and $M_2$ can be supplied to separate packaging machines, respectively.

The operation of the weighing apparatus which takes place during the discharge mode will now be described.

In the first place, the mode selector means 38 has to be manipulated to select the discharge mode and the group specifying means 48 is also operated to specify one of the groups. By so doing, the mode control means 39 supplies the discharge mode signal b to one of the control devices of the specified group, for example, the control device $31_1$, causing the control device $32_1$ to retain the pool hoppers 9, the weighing hoppers 10 and the booster hoppers 43 of the corresponding weighing heads $WH_1$ in a full open position in a manner similar to that described in connection with the control system shown in FIG. 2. Accordingly, the to-be-weighed articles $M_1$ remaining on the transport conveyor $1_1$ and the dispensing feeder 3 successively flow and are quickly discharged through the pool hoppers 9 and the weighing hoppers 10 and, at the same time, the to-be-weighed articles remaining within the booster hoppers 43 are also discharged. At this time, the feed capability of the dispensing feeder $3_1$ is preferred to be of a value higher than that exhibited during the weighing mode.

When after the attendant worker has ascertained a complete discharge of the articles $M_1$ with his or her live eyes, the other of the groups is specified by the group specifying means 48, the to-be-weighed articles $M_2$ are similarly allowed to flow and be quickly discharged through the pool hoppers 9 and the weighing hoppers 10 of the weighing heads $WH_2$ then retained in the opened position and, at the same time, the articles remaining within the booster hoppers 43 are also discharged. At this time, the pivotally supported chute $18_1$ or $18_2$ of the specified group which has received the discharge mode signal b are pivoted from the position facing the packaging machine 19 to the discharge position facing the recovery site $A_1$ and $A_2$ shown in FIG. 3 by the chute drive unit 34 then activated by the chute controls $35_1$ and $35_2$ which have received the discharge mode signal b. Accordingly, the two kinds of the articles $M_1$ and $M_2$ are recovered for reuse without being mixed together.

The system is not the one in which the two groups are continuously switched over to the discharge mode as hereinabove described, but the two groups may be switched over to the discharge mode simultaneously. Or either one of the groups can be switched over to the discharge mode. Where the two groups are switched over to the discharge mode at different timings delayed relative to each other, not simultaneously, it is sufficient to use a single pivotally supported chute 18 for both of the groups.

Where either one of the groups is switched over to the discharge mode, one of the groups is specified by the group specifying means 48. By way of example, if the first group is specified, the discharge mode signal b is supplied only to the control device $32_1$ associated with the specified group so that the control device $32_1$ can control the weighing heads $WH_1$ in the manner described above to facilitate a quick discharge of the articles $M_1$. The control device $32_2$ associated with the non-specified group receives neither the weighing signal a nor the discharge mode signal b and, therefore, such control device $32_2$ is held in an inactive state. Accordingly, since the articles $M_2$ are left remaining in the supply passages belonging to the non-specified group, no preparation for the supply of the articles $M_2$ for the subsequent cycle of combination weighing is required, thereby increasing the net operating rate of the combinational weighing apparatus. In contrast thereto, with the prior art combinational weighing apparatus, when the discharge mode is selected, all kinds of articles must unnecessarily be discharged even though only one or some kinds of the articles are to be changed.

It is to be noted that the present invention can be equally applied to the case in which the single apparatus is divided into three or more groups so that three or more kinds of articles can be handled.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, in any one of the foregoing preferred embodiments of the present invention, description has been made in connection with determination of a combination within the permissible range with the weight of the articles taken as a measured weight value. However, in the case of the articles to be weight such as, for examples, snacks and candies of a kind having slightly varying weights, the number of pieces within the permissible range may be determined and conversion of the measured weight into the number of pieces may be made so that a combination can be selected to allow the converted number of pieces to fall within the permissible range.

Also, while plural supply means S or $S_1$ and $S_2$ for supplying the to-be-weighed articles to the weighing hoppers 10 have been described as constituted by the driving feeders 7 and the pool hoppers 9, the supply means may not be always limited thereto, but may be of a type having, for example, no pool hopper.

Accordingly, such changes and modifications are, unless they depart from the scope of the present invention as delivered from the claims annexed hereto, to be construed as included therein.

What is claimed is:

1. A combinational weighing or counting apparatus which comprises:

a plurality of weighing devices each having a weighing hopper for weighing articles to be weighed while the articles are accommodated within the weighing hopper;

a plurality of supply devices for supplying the articles to the weighing hoppers, respectively;

a weighing device controller for controlling open/close operation of the weighing hoppers, a supply device controller for controlling supply from the supply device, a combination calculating means for performing a combinational calculation of a measured value of the articles measured by each of the weighing devices or a number obtained from the measured value to give a weight or a number falling within a permissible range;

a mode selecting means for selecting one of weighing and discharge modes;

a weighing mode executing means for operating, when the weighing mode is selected by the mode selecting means, to activate the combination calculating means and also to activate the supply device by driving the supply device controller, in association with selective opening and closing of the weighing hoppers; and a discharge mode executing means for operating, when the discharge mode is selected by said mode selecting means, to activate the supply device by driving the supply device controller, while the weighing hoppers are kept opened by driving the weighing device controller to thereby continuously discharge the articles remaining within the supply means to an outside of the apparatus.

2. A combinational weighing or counting apparatus which comprises:

a plurality of weighing devices each having a weighing hopper for weighing articles to be weighed while the articles are accommodated within the weighing hopper;

a plurality of supply devices for supplying the articles to the weighing hoppers, respectively;

a weighing device controller for controlling open/close operation of the weighing hoppers, a supply device controller for controlling supply from the supply device, a group dividing means for dividing into a plurality of groups supply passages each leading from each of the supply means to the associated weighing hopper;

an article delivery means employed for each of the groups for delivering the articles;

a combination calculating means for performing a combinational calculation of a measured value of the articles measured by each of the weighing devices of each group or a number obtained from the measured value to give a weight or a number falling within a permissible range for each group;

a mode selecting means for selecting one of weighing and discharge modes;

a group specifying means for specifying one of the groups to be set in the discharge mode by the mode selecting means; and a weighing mode executing means for operating, when the weighing mode is selected by the mode selecting means to activate the combination calculating means and also to activate the supply device by driving the supply device controller, in association with selective opening and closing of the weighing hoppers; and a discharge mode executing means for operating, when the discharge mode is selected by the mode selecting means to activate the supply device by driving the supply device controller, while the weighing hoppers of one of the groups specified by the group specifying means are kept opened by driving the weighing device controller to thereby continuously discharge the articles remaining within the supply means to an outside of the apparatus.

3. The combinational weighing or counting apparatus as claimed in claim 1 or claim 2, wherein the supply device controller operates when the weighing mode is selected to control a feed capability of each of the supply device on the basis of weighed value, but operates when the discharge mode is selected to control the feed capability to a predetermined level.

4. The combinational weighing or counting apparatus as claimed in claim 1, further comprising a feed parameter setting means for regulating a feed capability of each of the supply devices;

wherein each of said supply devices includes a driving feeder for supplying the articles, and a pool hopper for storing the articles supplied from the driving feeder; and wherein said weighing mode executing means operates, when the weighing mode is selected, to cause the feed parameter setting means to set the feed capability of each of the driving feeders to a value required for the weight or number of the articles, stored in the respective pool hopper, to attain a predetermined target supply value, and said discharge mode executing means operates, when the discharge mode is selected, to cause all of the pool hoppers and, also, all of the weighing hoppers to be opened and also to cause the feed parameter setting means to set the feed capability of all of the driving feeders to a value greater than that sustained during the weighing mode.

5. The combinational weighing or counting apparatus as claimed in claim 2, further comprising a feed parameter setting means for regulating a feed capability of each of the supply devices;

wherein each of said supply devices includes a driving feeder for supplying the articles, and a pool hopper for storing the articles supplied from the driving feeder; and wherein said weighing mode executing means operates, when the weighing mode is selected, to cause the feed parameter setting means to set the feed capability of each of the driving feeders to a value required for the weight or number of the articles, stored in the respective pool hopper, to attain a predetermined target supply value, and said discharge mode executing means operates, when the discharge mode is selected, to cause both of the pool hoppers and the driving feeders of the group specified by the group specifying means to be opened and also to cause the feed parameter setting means to set the feed capability of the driving feeders of the group specified by the group specifying means to a value greater than that sustained during the weighing mode.

6. A combinational weighing or counting method which comprises the steps of:

supplying articles to be weighed from a plurality of supply devices to a plurality of weighing devices each having a weighing hopper;

performing a combinational calculation of a measured weight or number of the articles measured by each of the weighing devices to determine a combination in which the weight or number of the articles may fall within a permissible range;

selecting one of weighing and discharge modes;

when the weighing mode is selected, performing the combinational calculation and activating the supply device in association with selective opening and closing of the weighing hoppers; and when the discharge mode is selected, activating the supply device while the weighing hoppers are kept opened to thereby continuously discharge the articles remaining within the supply means to an outside.

7. A combinational weighing or counting method which comprises the steps of:

dividing into a plurality of groups a plurality of supply passages through which articles to be weighed are supplied, each of said supply passages leading from a supply device to a corresponding weighing device having a weighing hopper;

delivering the articles for each group;

performing a combinational calculation of a measured weight or number of the articles measured by the weighing devices of each of the groups to determine a combination in which the weight or number of the articles may fall within a permissible range for each group;

selecting one of weighing and discharge modes;

specifying one of the groups which is to be set under the discharge mode;

when the weighing mode is selected, performing the combinational calculation and activating the supply device in association with selective opening and closing of the weighing hoppers; and when the discharge mode is selected, activating the supply device while the weighing hoppers of the specified group are kept opened to thereby continuously discharge the articles belonging to the group to an outside.

* * * * *